United States Patent [19]
Van Laar et al.

[11] 3,806,313
[45] Apr. 23, 1974

[54] HEAT REGENERATOR

[75] Inventors: Jacobus Van Laar, Santpoort; Jacob Felthuis, Oudorp; Hendrik Gustaaf Otto Weber, Heiloo, all of Netherlands

[73] Assignee: Hoogovens Ijmuiden B. V., Ijmuiden, Netherlands

[22] Filed: Nov. 17, 1972

[21] Appl. No.: 307,390

[30] Foreign Application Priority Data
Nov. 19, 1971  Netherlands.......................7116003

[52] U.S. Cl................................. 432/214, 432/217
[51] Int. Cl................................................ F23l 9/04
[58] Field of Search ............ 432/214, 217, 218, 219

[56] References Cited
UNITED STATES PATENTS

| | | | |
|---|---|---|---|
| 2,196,882 | 4/1940 | Whelpley | 432/218 |
| 3,376,115 | 4/1968 | Kraft et al. | 432/214 X |
| 1,140,872 | 5/1915 | Brown | 432/217 |

FOREIGN PATENTS OR APPLICATIONS

| | | | |
|---|---|---|---|
| 1,212,177 | 11/1970 | Great Britain | 432/217 |

*Primary Examiner*—John J. Camby
*Attorney, Agent, or Firm*—Hall & Houghton

[57] ABSTRACT

A heat regenerator of the type comprising, within a wall of refractory material, a space containing a pile of bricks (checker brick) and a burner stack separated therefrom by a separating wall, the cylindrical wall of the heat regenerator and the separating wall consisting of more than one layer of refractory material, in which at least for part of the walls and in particular for the separating wall between checker bricks and burner stack, at least one of the layers of refractory material is subdivided by a vertically extending expansion joint to avoid cracks, damage and gas leaks through the concerning wall or walls. Preferably there is a number of such joints in the separating wall, extending at least over the height of the lower half of the burner stack. The facing edges of the layer at the joint have grooves with sealing bricks engaging therein or tongues and grooves engaging sealingly, with a compressible filler of ceramic wool or felt sealing the joint in cold condition of the regenerator.

9 Claims, 5 Drawing Figures

PATENTED APR 23 1974 3,806,313

HEAT REGENERATOR

This invention relates to a heat regenerator of the type comprising, within a wall of refractory material, a space containing a pile of bricks (checker brick) and a burner stack separated therefrom by a separating wall, the cylindrical wall of the heat regenerator and the separating wall consisting of more than one layer of refractory material. Such heat regenerators are frequently used as so-called air preheaters, cowpers or hot blast stoves for blast furnaces in order to preheat the air to be fed to the blast furnace.

As higher requirements are made to such air preheaters as to the maximum attainable temperatures of the dome and of the preheated air with increasing quantities of air preheated per unit time, it appears to become gradually more and more difficult to design a refractory structure, in particular for the separating wall, which remains without any damage under such extreme operating conditions. Also for parts of the cylindrical wall the avoiding of cracks under such circumstances becomes a more and more difficult problem.

In this respect it is remarked that the separating wall is subjected alternately to high and low temperatures, as the regenerator is switched from "on gas" to "on blast" and the reverse, and that in view thereof very high temperature differences and gradients to both sides of said separating wall have to be faced.

It has already been tried in different ways, with more or less success, to design a structure, in particular of the separating wall, which is able to cope with the situation. Among others good results have been obtained by applying a sliding joint within the separating wall and in the main plane thereof, sometimes in combination with heat insulating layers to one or both sides of such a sliding joint. It has, however, appeared that under certain circumstances of operation, and particularly for very large air preheaters, longitudinal cracks in the walls may even so occur. Circumstances causing such cracks are e.g. the occurrence of high temperature gradients and non-uniform distribution of temperatures with high temperature differences over relatively short distances. This entrains considerable differences in thermal expansion in nearby areas which cause the cracks. Cracks in the separating wall may also be caused by strong pressure impacts by explosionlike combustions in the burner stack if the fuel does not ignite properly at the beginning of a heating-up period (an "on gas" period). It is also possible that locally cracks occur in the cylindrical wall of the regenerator near the hot air outlet as a result of the fact that the inner layers of the refractory masonry in this area are avoided to expand sufficiently freely in a radial direction. The masonry work of the outlet opening limits or entirely prevents the deformation of these inner layers of the cylindrical wall.

Due to the present invention a design has now been found which almost entirely avoids the danger of the occurrence of longitudinal cracks due to such causes.

In view thereof the invention consists in that, at least for part of the walls, at least one of the layers of refractory material is subdivided by a vertically extending expansion joint. In particular it is proposed as a preferable embodiment according to the invention to subdivide each of the several layers of refractory material of the separating wall by vertically extending expansion joints, at least over the height of the lower half of the burner stack, said expansion joints being formed by mutually engaging profiled shapes over the entire height of the joints, present in the walls of the parts of the layers facing each other. If the burner is a so-called ceramic burner, present in the burner stack, the burner stack is, for this height characteristic, considered to extend upwardly beginning at the head or top face of the burner. It is clear that the function of such profiled shapes is to allow expansion of the wall parts locally without allowing leakage of hot gases or hot air along said joints. It is possible to avoid such leakage further according to the invention in providing the expansion joints in subsequent layers of the separating wall in stepped or staggered position with respect to each other. It is remarked that such profiled parts engaging one into the other for such joints is of more importance in the separating wall than in the cylindrical wall.

The number of expansion joints is chosen in dependency of the dimensions of the separating wall and of the operating conditions as to temperature and pressure to be reached when operating the regenerator. It has appeared that for small air preheaters with not too high quantities of air and not extremely high temperatures a good effect is already obtained by applying one single expansion joint in the separating wall. It has appeared that according to the invention good results may be obtained if the subsequent expansion joints present in a wall part in the same layer have a mutual horizontal distance of 1–2 m. The difficulties described above, which may occur at the outlet opening for the heated air, appear to have been solved in the structure according to the present invention. Due to the presence of expansion joints in the part of the cylindrical wall in the zone of said outlet opening, it is no more necessary that the inner layers of said wall are displaced in a radial direction to take up heat expansions.

It has already been remarked that, for avoiding gas leakage, the walls of the expansion joints have to have a profiled shape which allows a mutual sliding of the wall parts in the plane of the separating wall with respect to each other, but which keep such wall parts always in sealing contact with each other. In principle it is possible to give the walls of the expansion joints a single and simple stepped shape. A better coherence of the wall parts is, however, obtained if the expansion joints are formed by tongue and groove shapes in the walls of the joints facing each other, such parts having a trapezoid shape, the parts of the joint which are open in cold condition of the structure being entirely or in part filled with a compressible refractory filler material. Such refractory filler materials are frequently used in refractory wall structures of furnaces and the like. Good results are in this respect obtained with ceramic felt material or ceramic wool. A trapezoid shape is in this sense considered to be a trapezoid in a general geometrical sense. It will be clear that for the manufacture of the bricks for such a wall the most simple shape is the shape of a real trapezoid. However, for such a shape the gas-tight sealing is not as best as it could be. For such sealing an embodiment of these tongue and groove parts is preferred in which the trapezoid is almost or entirely transformed into a rectangle, which is the limiting shape for a trapezoid in the geometrical sense.

According to another embodiment of the invention the expansion joints are formed by recesses in the walls of the joints facing each other, the hollow space thus formed being filled by bricks slidable therein. Great care should be given to the necessity to shape and dimension the expansion joints so that during operation of the air preheater gas leakage along the expansion joints is excluded, in other words that during operating conditions the joints are gas-tight in those areas where this is necessary, which, as stated, is particularly true for the separating wall and less for the outer wall. To obtain such gas-tightness the joints which might cause through-going gas leakage paths are filled as completely as possible by a refractory felt material. Moreover according to the invention the expansion possibility allowed by the joints is larger than corresponding to the thermal expansion of the layers in a horizontal direction, transverse to the joints, to about the highest operating temperature which may occur in the same region. Preferably it should be avoided that the separating wall at this temperature would no more have any possibility of further expansion and thus would be put under pressure if by some reason the temperature accidentally would rise above such a temperature. It is surprising for the expert that in this way it is nevertheless possible to obtain a sufficiently gas-tight structure, particularly in view of the serious problems which were experienced up to now in trying to keep large and highly loaded air preheaters free from cracks and gas-tight.

As has already been remarked the expansion joints have to be provided over at least the height of the lower half of the burner stack. The best results are obtained by having the joints extend over the entire height of each of the layers. This also gives a more simple structure, as transition structures between a part with joints and a part without joints at the end of each expansion joint can thus be avoided. The greater danger of the occurrence of leakages through the separating wall as a result of the greater length of the expansion joints appears in practice not to be present, probably because the pressure difference over the separating wall is high at the bottom and decreases to zero at the top of the separating wall.

It appears in particular that the invention gives very good results when applying it to the type of air preheater known from the Dutch patent application 68.11373 laid open to public inspection, which has at least one vertical sliding joint all around in the plane of the separating wall and in the outer cylindrical wall limiting the other side of the burner stack.

The invention will now be explained in more detail with reference to the enclosed drawings, by way of example only.

Figure 1:
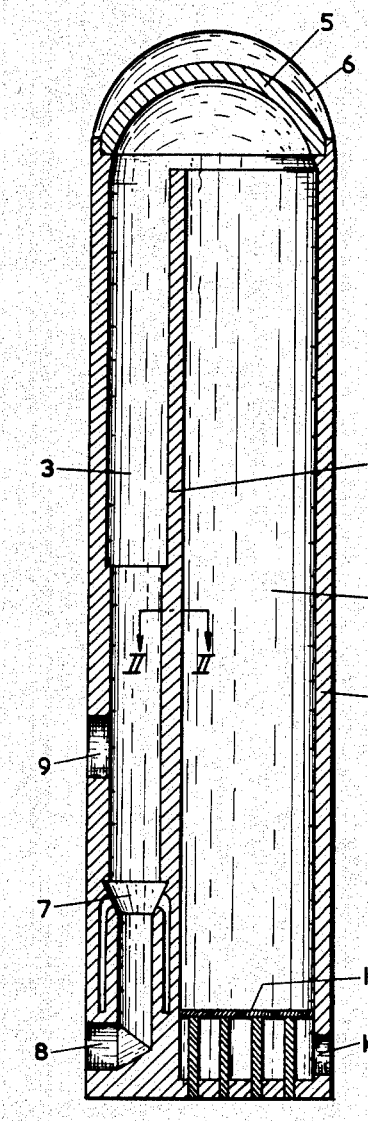
FIG. 1 shows somewhat diagrammatically an air preheater of a shape known in essence, in longitudinal, vertical section.

In FIG. 1 reference numeral 1 shows the cylindrical outer wall of an air preheater, being a hot blast stove for a blast furnace. Within this preheater a separating wall 2 divides the space into a burner stack 3 and a space 4 for a pile of refractory and heat accumulating bricks (checker bricks), which two spaces are in open communication with each other above the separating wall 2. A brick dome 5 and a steel dome 6 cover the top of the air preheater.

In the lower part of the burner stack 3 there is a ceramic burner 7, into an through which passage 8 feeds gaseous fuel, which is burnt with air supplied to other passages of the burner. Openings 9 and 10 serve for guiding the air through the air preheater, the air to be preheated entering at 10 and leaving at 9 ("on blast"), opening 10 also serving to discharge the gases from the preheater when combustion takes place in the burner stack to accumulate heat in the checker bricks 4 ("on gas"). The pile of bricks in the space 4 rests on a grid 11.

Figure 2:
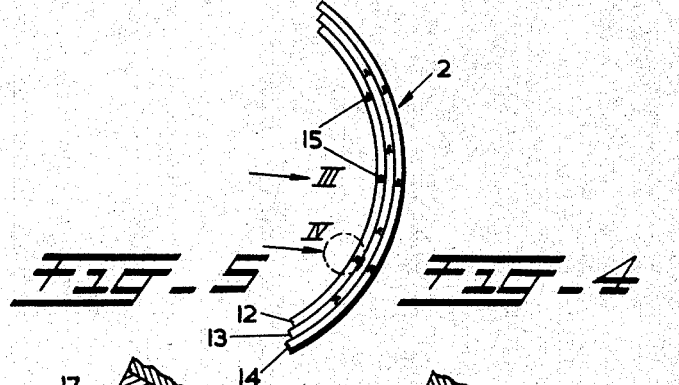
FIG. 2 is a transverse section of a detail if this air preheater according to line II—II in FIG. 1.

In the transverse section of FIG. 2 the separating wall 2 is shown as a separate part, without the surrounding parts of the air preheater.

Figure 3:
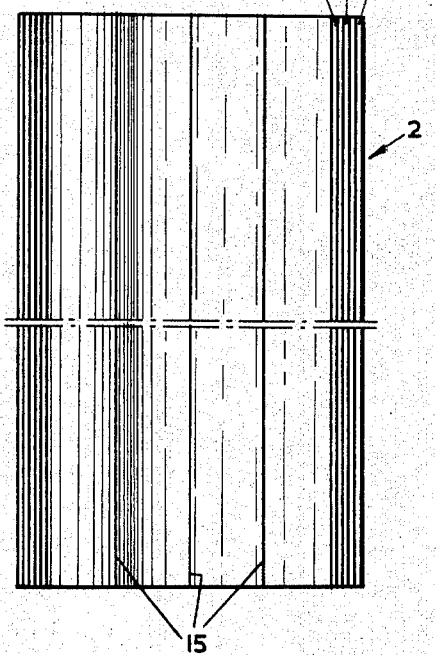
FIG. 3 is a side view of said detail according to FIG. 2.

In FIG. 3 this wall is shown in a view along the arrow III in FIG. 2. In said FIGS. 2 and 3 reference numerals 12, 13 and 14 show three layers of masonry work one behind the other constituting the separating wall or at least part thereof. It is possible that these layers have been made so as to be fully in contact with each other, but there may also be some space between one layer and another layer to form a sliding joint.

If desired one or more of such sliding joints may continue into an through the masonry work of the lining 1, in the zone which limits the burner stack at the other side, so at the left in FIG. 1. In each one of the layers 12, 13 and 14 expansion joints 15 have been provided in three zones for the left layer 12 and the right layer 14 and in four zones for the central layer 13.

Figures 4, 5:
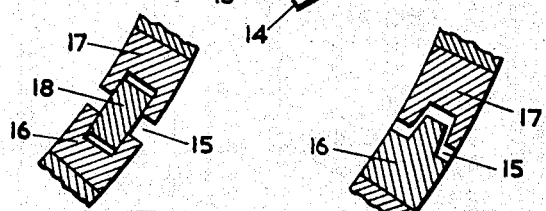
FIG. 4 shows part of FIG. 2 on an enlarged scale.
FIG. 5 shows the same detail in another embodiment.

In FIG. 4 detail IV from FIG. 2 has been shown on a considerably enlarged scale. It is clear therefrom that the expansion joint 15 is formed by a protruding part of a brick 16, which fits into a slot-shaped recess in a brick 17 in such a way that between said two bricks a movement is possible in the plane of the separating wall. Protruding and recessed parts (tongue and groove) are in this Figure shown as being somewhat in the shape of a trapezoid. During such movement the protruding part slides substantially along but not intimately in contact with the walls of the recess, so that a good resistance against gas leakage along the expansion joint is maintained. This resistance is increased if said trapezoid shape is more approaching the shape of a rectangle, but in practice a slight taper to form a trapezoid is sufficient also for gas-tightness.

The width of the joint 15 has been chosen depending upon the thermal expansion of layers 12, 13 and 14 during operation of the air preheater. The width of the joint may be chosen so that the expansion joint during operating conditions of the air preheater is entirely or substantially closed, but preferably it is chosen so that the joint is not fully closed at normal operating temperature to allow for unexpected temporary further rises in temperature. The gas-tightness of the expansion joints during the intermediary phases in which the air preheater is heated to operating condition may be obtained by filling the open spaces in the expansion joints during building up of the separating wall by a compressible material, e.g. of ceramic wool or felt.

In FIG. 5 the same detail IV of FIG. 2 has been shown in another embodiment. Here both in brick 16 and in brick 17 there is a recess extending vertically along such bricks, and a series of filling bricks 18 is slidably positioned in and between such bricks 16 and 17 to engage in said recesses. Such bricks 18 keep the expansion joint 15 closed in a gas-tight manner in all possible positions during operation.

We claim:

1. In a heat regenerator assembly comprising a cylindrical wall member of refractory brick and a separating vertical wall section of refractory brick positioned interiorly therein thereby forming within said cylindrical wall member a separate zone for receiving a pile of refractory and heat accumulating bricks and a separate burner stack zone, the improvement comprising having said vertical wall section made up of at least two side by side vertically extending wall portions of refractory material with each said wall portion comprising layers of refractory material elements in substantially face to face relation and with at least one of the layers of at least one of the wall portions of the vertical wall member for at least part of the length thereof having vertically extending, horizontally expansible expansion joint means between the abutting ends of said refractory material elements making up the layers of the wall portions to permit circumferential expansion thereof.

2. A heat regenerator in accordance with claim 1, wherein each of the several layers of refractory material of the wall portions forming the separating wall have such vertically extending expansion joints for at least over the height of the lower half of the burner stack, said expansion joints being formed by mutually engaging profiled shapes extending for the entire height of the joints.

3. A heat regenerator according to claim 2, wherein the expansion joints in said layers of the wall partitions forming the separating wall are staggered mutually.

4. A heat regenerator in accordance with claim 1, wherein said expansion joints each include cooperating protruding and recessed portions each forming a tongue and groove assembly, the portions of said joints which are in spaced relation when in the cold state being filled at least in part with a compressible refractory filler material.

5. A heat regenerator in accordance with claim 4, wherein the tongue and groove assembly has a trapezoidal configuration.

6. A heat regenerator according to claim 4, the tongue and groove assembly having a rectangular configuration.

7. A heat regenerator according to claim 1, wherein the expansion joints in the layers of the wall portions are formed by recesses in the abutting ends of the refractory material making up the layers of the wall portions, the hollow space thus formed being filled by refractory elements slidable therein.

8. A heat regenerator according to claim 1, wherein the expansion permitted by the joints is larger than the thermal expansion of the layers in a horizontal direction transverse to the joints, at about the highest operating temperature which may occur in the same region.

9. A heat regenerator according to claim 1, wherein the joints extend over substantially the entire height of each of the layers of the wall portion in which they are provided.

* * * * *